Patented Sept. 29, 1936

2,056,065

UNITED STATES PATENT OFFICE 2,056,065

BEVERAGE

Roe Stubbs Freeman, Atlanta, Ga., assignor to Estelle B. Reed, Atlanta, Ga.

No Drawing. Application December 13, 1932, Serial No. 647,073

2 Claims. (Cl. 99—199)

This invention relates to beverages and aims to provide a greatly improved flavored tea, such as is used for making iced and hot tea. The main idea is to incorporate with ordinary Ceylon or other tea, specially treated spearmint to impart a delightful flavor and other properties when the essence of the leaves is extracted by the usual method for making the beverage.

In accordance with the preferred method, green spearmint leaves and the upper portions of the plant are cured by slow heat treatment in an oven. It has been found that sun-cured spearmint loses its flavoring qualities. Moreover, the sun discolors and parches the leaves, making them brittle so that the leaves easily crumble or break up into almost a powdered form. A batch of the leaves and the upper portions of the branches are placed in an oven and the temperature is gradually raised from 70° F. to 120° over a period of approximately 12 hours. Then, the temperature is gradually decreased from 120° F. to 70° for a period of about 8 hours. Thereafter, the temperature is again gradually raised to 120° for another period of approximately 12 hours to insure the removal of practically all of the moisture from the leaves without discoloring and parching them. The slow oven treatment at temperatures less than 125° produces very satisfactory results.

The cured spearmint leaves and the stems or upper branches are then cut or separated into small pieces preferably approximating the size of cured tea leaves so that the pieces can be mixed thoroughly with the tea leaves. Then, approximately 1% by volume of the cured spearmint is added to and mixed with a batch of the tea leaves. However, the proportion of spearmint may be varied between 1% and about 3% by volume. The small quantity of spearmint imparts its flavoring to the tea when boiling or hot water is poured over the mixture. The essence of spearmint is extracted from the cured leaves and stems and is thoroughly mixed with the essence of the tea.

The treated spearmint not only greatly improves the flavor of the tea, but also imparts certain therapeutic qualities to it. It is well known that it is stimulating and refreshing. It tends to prevent the formation of gas and acts as a carminative, thus relieving colic due to gas and aiding digestion. When tea is prepared according to the method described, it preserves the original spearmint in its natural state without losing flavoring quality. Repeated trials have demonstrated that it is far superior to the ordinary beverage flavored after it is made.

Obviously, the invention is not restricted to the exact steps of the method herein described.

What I claim and desire to secure by Letters Patent is:

1. That method of curing spearmint for flavoring and blending with tea leaves which comprises subjecting fresh green spearmint stalks and leaves to a slow, gradually increasing oven temperature not exceeding approximately 120° F.; gradually reducing the oven temperature; then subjecting the partially dried leaves to a uniform oven temperature of approximately 120° F. for a very substantial period to preserve the original color and flavor of the spearmint; and then cutting up the cured stalks and leaves to be mixed with cured tea leaves.

2. That method of preparing spearmint for blending with tea leaves which consists in placing fresh, green spearmint in an oven; slowly raising the oven temperature to approximately 120° F. over a period of approximately 12 hours; allowing the oven to cool gradually for several hours to a temperature of approximately 70° F.; then, gradually raising the oven temperature for another period of several hours to remove practically all of the moisture from the spearmint without discoloring or parching it; and cutting up the spearmint into pieces of such size as to mix with ordinary, cured tea leaves.

ROE STUBBS FREEMAN.